(12) United States Patent
Horigane (10) Patent No.: US 6,635,295 B1
(45) Date of Patent: Oct. 21, 2003

(54) METHOD FOR FREEZE-DRYING AND FREEZE-DRIED PRODUCT

(75) Inventor: Akira Horigane, Tsukuba (JP)

(73) Assignees: National Agricultural Research Organization, Tsukuba (JP); Tsukuba Food Science, Inc., Ushiku (JP)

(*) Notice: Subject to any disclaimer, the term of this patent is extended or adjusted under 35 U.S.C. 154(b) by 0 days.

(21) Appl. No.: 09/744,045

(22) PCT Filed: May 19, 2000

(86) PCT No.: PCT/JP00/03209
§ 371 (c)(1),
(2), (4) Date: Jan. 16, 2001

(87) PCT Pub. No.: WO00/70973
PCT Pub. Date: Nov. 30, 2000

(30) Foreign Application Priority Data

May 19, 1999 (JP) ............................................. 11-139197

(51) Int. Cl.[7] ................................................ A23L 3/44
(52) U.S. Cl. ........................ 426/385; 426/384; 426/444; 426/524
(58) Field of Search ................................. 426/385, 384, 426/444, 524

(56) References Cited

U.S. PATENT DOCUMENTS 4,339,884 A * 7/1982 Andrews
5,023,096 A * 6/1991 Plochman
6,098,410 A * 8/2000 Horigane

* cited by examiner

*Primary Examiner*—Anthony J. Weier
(74) *Attorney, Agent, or Firm*—Flynn, Thiel, Boutell & Tanis, P.C.

(57) ABSTRACT

A process for producing a freeze-dried product in a bonded or stratified state by a simple apparatus and by simple operations, without suffering from denaturation by oxygen, enzymes, heat and so on, while maintaining the original quality, properties and so on, by bonding or stratifying materials to be treated before being subjected to freeze-drying; an apparatus therefor; and a freeze-dried product obtained therefrom are provided. The freeze-dried product is obtained by stratifying materials 7a, 7b and 7c of the same or a different kind to be treated into a multilayer under interposition of dry ice 6b, 6c partly in between the layers; pressing the multilayer from both sides by pressurizing elements 13 and 16 under intermediation by dry ice 6a and 6d to effect bonding of the materials to be treated with each other, while, at the same time, freezing the multilayer; and subjecting the frozen product to vacuum drying.

20 Claims, 3 Drawing Sheets

METHOD FOR FREEZE-DRYING AND FREEZE-DRIED PRODUCT

FIELD OF THE INVENTION

The present invention relates to a process for freezing or freeze-drying a material which is susceptible to denaturing, such as a food or drink, a living organism, organic material, drug, biological sample, feed or industrial raw material, a frozen or freeze-dried product obtained by such a process and to an apparatus for effecting the freezing or freeze-drying.

BACKGROUND OF THE INVENTION

For storing, transporting and bringing into practical use materials susceptible to denaturing, comprising organic substances, such as foods and drinks, living organisms, such as animals, plants and microbes, organic materials, drugs, biological samples, feeds and industrial raw materials, they are often subjected to freeze-drying. For example, foods and drinks, especially food products are freeze-dried for storing and transporting and are brought into dietary services in the freeze-dried state as such or after being hydrated with the addition of water or further processed. In the case of biological samples, they are prepared by a series of operations for processing a living organism by, for example, freezing, drying, crushing and homogenization.

The freezing procedure for freeze-drying may generally be realized using a refrigerator. Here, it takes a prolonged period of time until the freezing temperature is reached, during which the material to be processed may suffer from denaturation due to the action of oxygen or enzymes. Even if the frozen material is subjected to vacuum drying, a freeze-dried product without being subjected to denaturation may be difficult to obtain. When a food is frozen in a refrigerator and, then, freeze-dried, so-called shrinkage phenomenon may occur, in which, due to shrinkage and drying of, for example, cellulosic tissues of brake, tissues of, for example, muscles of cuttlefish and cell walls of chlorella, they are converted into dried brake, dried cuttlefish and chlorella beads or in which, due to the contraction of an internal mass of, for example, cheese, into an isolate solid lump inside the mass to form an internal cavity, whereby a decrease in the taste or feel in mouth undesirably results with a concurrent lowering of the digestion of such food.

Freeze-drying may often by practiced after the material to be processed has preliminarily been treated by, for example, crushing and forming into thin films, in order to increase the drying efficiency. Such a crushing operation may cause a temperature elevation of the material due to a heat evolution upon crushing. The material to be processed may suffer from denaturing due to such a temperature elevation and due to enzymes present in the system, so that the freeze-drying may not be realized under crushing and forming into thin films while preserving the original quality and condition of the material.

For eliminating such difficulties, it has been practiced to freeze the material using liquid nitrogen or, in addition, to exclude oxygen. However, such countermeasures require, due to the very low temperature of liquid nitrogen (minus 196° C.), large scale arrangements and, due to the exclusion of oxygen, a safety measure, so that a freeze-dried product may not be obtained in an easy and convenient way.

An object of the present invention is to provide a method for producing a freeze-dried product of a material to be processed, by subjecting it to freezing and vacuum drying by a simple apparatus and simple operations, in a state in which the intrinsic quality and properties, etc., of the original material are preserved without suffering from denaturing of the material due to the actions of oxygen, enzymes, heat and so on; to provide an apparatus therefore; and to provide a freeze-dried product obtained therefrom.

Another object of the present invention is to provide a process for producing a freeze-dried product of a material in a bonded or in a stratified state, by subjecting the material to freeze-drying under bonding or stratifying of the material, while preserving the intrinsic quality and properties, etc., of the original material using a simple apparatus by simple procedures without suffering from denaturing of the material due to the actions of oxygen, enzymes, heat and so on; an apparatus therefor; and a freeze-dried product obtained therefrom.

DISCLOSURE OF THE INVENTION

The present invention consists of the following process for freeze-drying, apparatus therefor and freeze-dried product:

(1) A process for freeze-drying, comprising cooling one or more materials to be treated, in a state separated from or in contact with each other, by dry ice to freeze the material(s) and subjecting the frozen product to vacuum drying.

(2) A process for freeze-drying, comprising stratifying materials of the same or different kind to be treated into multilayers, freezing the multilayers in a state in which dry ice is interposed between the layers and subjecting the frozen multilayers to vacuum drying.

(3) The process as defined in the above (2), wherein dry ice is interposed between the layers partly so as to leave the portions devoid of dry ice in a state adhered to each other, in order to form a vacant space at the portion where dry ice is interposed.

(4) The process as defined in any one of the above (1) to (3), wherein the freezing is effected under a condition pressurized by the material's own weight or by an external pressure.

(5) The process as defined in any one of the above (1) to (4), wherein the freezing is effected while breaking the material to be treated by pressurizing it so as to cause formation of cracks.

(6) A freeze-dried product obtained by the process as defined in any one of the above (1) to (5).

(7) Foods and drinks comprising the freeze-dried product as defined in the above (6).

(8) A composite product in which the freeze-dried product as defined in the above (6) is compounded with other material(s).

(9) A hydrated product obtained by hydrating the freeze-dried product as defined in the above (6).

(10) A composite product in which the hydrated product as defined in the above (9) is compounded with other material(s).

(11) An apparatus for effecting freeze-drying, comprising
 a freezing apparatus in which one or more materials to be treated are cooled in a state in which they are separated from or in contact with each other by dry ice to freeze the material(s) and
 a vacuum drying apparatus in which the frozen product obtained in the freezing apparatus is subjected to vacuum drying.

(12) The apparatus as defined in the above (11), wherein the freezing apparatus operates to freeze multilayers of the material to be treated under a condition in which dry ice is interposed between the layers partly.

(13) The apparatus as defined in the above (11) or (12), wherein the freezing apparatus comprises a pressurizing means.

(14) The apparatus as defined in the above (13), wherein the freezing apparatus comprises pressurizing elements which operate to impress a pressure onto a single layer or multilayers of the material placed therebetween together with dry ice.

(15) The apparatus as defined in the above (14), wherein the freezing apparatus comprises a traveling means operable to cause the pressurizing elements to travel within a pressurization unit.

(16) A method of analysis, in which the freeze-dried product defined in the above (6) is used as the analytical sample.

(17) An apparatus for analysis, in which the freeze-dried product defined in the above (6) is used as the analytical sample.

The materials to be treated by freeze-drying according to the present invention are those susceptible to denaturation, including foods and drinks, organisms, organic materials, drugs, biological samples, feeds and industrial raw materials, in particular those comprising organic materials having reducing functional groups susceptible to denaturing by the actions of oxygen, enzymes, heat and so on. They may be present in any voluntary form, such as a lump, liquid, jelly, paste or slurry, including crushed or pulverized form. Typical materials to be treated may be in a hydrated state, though dried materials may be included so long as they permit processing, e.g. homogenization, by mixing with water or with hydrated materials.

Further, materials which are not susceptible to denaturation, including filter paper, textiles, non-woven fabrics, nets, films, sheets and plates, may also be subjected to freeze-drying by treating them together with the above-mentioned material susceptible to denaturation in a state integrated bodily therewith.

The foods and drinks, organisms, organic materials, drugs, biological samples, feeds and industrial raw materials and so on are not enumerated as parallel concepts but fall under a mere exemplification of materials capable of being treated. The foods and drinks may be in a solid or liquid state, wherein those having consistencies or water contents permitting stratification may be used for being stratified as the material to be treated. The foods and drinks may be composed essentially of organic materials, though inorganic materials may also be included. As the organism, whole bodies or a part (a tissue) of an individual of an animal or plant, cells and microorganisms, such as chlorella, Spirillina and so on, may be dealt with. As the organic materials, not only such organisms as above, but also those organic substances derived from such organisms may be dealt with. While the feeds, drugs and industrial raw materials may generally comprise living organisms and organic materials, inorganic materials may also be dealt with in accordance with the present invention so long as they are susceptible to denaturation. The biological samples may, in general, be analytical samples consisting of organisms, though other samples may also be dealt with.

Dry ice may be a compacted product of solid carbon dioxide which sublimates at −78.5° C. under atmospheric pressure. Any commercial product sold as a coolant or the like may be used as dry ice. Such a dry ice product can be crushed easily by applying a compressive force thereto in a mixer-crusher and, thus, can be used in a voluntary form and size, wherein, for example, a product having particle sizes of about 1–10 mm may be preferable. The amount of dry ice to be used may vary depending on the kind, moisture content, consistency and so on of the material to be treated, while it may in general range from 0.01 to 5 parts, preferably from 0.05 to 1 part by weight per one part by weight of the material to be treated. In the case where dry ice is placed between layers, it is favorable to use dry ice having a particle size of 1–5 mm in an amount of 0.01–0.5 part by weight, preferably 0.05–0.1 part by weight, per one part by weight of the material to be treated.

According to the present invention, one single material or a plurality of materials to be treated are cooled by dry ice in a state separated from or in contact with each other to cause them to freeze and, by subjecting the frozen product to vacuum freezing, a freeze-dried product is produced. When the material to be treated is frozen in the original state as such, the material can be frozen in a sole piece or in pieces isolated from each other. For example, fruits, vegetables and the like may be frozen as a whole body or in cut pieces. A material to be treated which is in a form of liquid, slurry, paste or so on can be frozen into a single layer or frozen product by filling or piling it in or on a vessel.

In the case of producing a freeze-dried product in which a plurality of materials to be treated are bonded together, the plurality of materials to be treated are subjected to freezing under a state in which the materials are in contact with each other to thereby cause the materials to adhere to each other at the contacted areas, whereby a frozen product in which a plurality of materials are bonded together is obtained, from which a freeze-dried product containing a plurality of materials to be treated in a state adhered to each other is obtained by vacuum drying. Here, the materials to be bonded together may be of either the same or a different kind. The material may have a skin, as in the case of a fruit, and may favorably have a water content of 10% by weight or more, preferably 10–90% by weight.

It is also possible to bond a hydrous or a fibrous material with an oily material. For example, a hydrous material, such as a vegetable or a fruit, may be bonded to a fatty substance to freeze-dry the bonded product. Here, it is possible to effect the freeze-drying for a product having the fatty substance under impregnation, such as a fried food, though it is permissible to integrate the fatty substance with a hydrous or fibrous material on the surface thereof. In the case of the latter, it is possible to effect the integration by coating on the surface of the hydrous or fibrous material with the fatty substance and freezing the coated product or, alternatively, by forming a layer of the fatty substance on the surface of a pressing member, scattering dry ice thereonto over partial areas thereof and placing thereon the hydrous or fibrous material, whereupon the resulting lamination is frozen to be bodily integrated while pressing it. By bonding a layer of a fatty substance to the surface in this manner, a freeze-dried product which can easily be swallowed can be obtained.

When the material to be treated subject to denaturation is to be integrated with a material to be treated not subject to denaturation used as a support, such as filter paper, non-woven fabric, net, film, sheet or plate, the support material may be bonded with the hydrous material to be treated under intermediation by dry ice or by cooling with dry ice to effect freeze-drying, in order to obtain a freeze-dried product in which they are integrated. When the material to be treated subject to denaturation is put between two pieces of a support material to integrate them, the integrated product can serve as, for example, an analytical sample, since 100% recovery of the freeze-dried product of the material to be treated can be attained. When, in this case, the integration is effected while pressing the product together with a hard substance, such as glass fiber, aramid fiber or ceramic powder, the material to be treated may be recovered as a freeze-dried product in a state in which it is caused to collapse by the hard substance at an ultralow temperature or in which fibers are stuck into the material, so that it can be used, for example, for extracting a sample for analysis and for extracting a food constituent, such as a flavor or so on.

While it is favorable, for bonding a plurality of materials to be treated to each other, that each has a face for being bonded together, bonding may be attained even for materials having a convex face to be bonded, so long as these faces can be deformed by being pressed together into faces adapted to be bonded together and, in particular, the bonding adhesion may be increased when water exudes from inside during the pressing together and is frozen. The pressing of the materials onto each other may be effected by the weight of the material or in a mechanical way.

It is possible, for producing a freeze-dried product of multilayers bonded with each other, to effect bonding of the layers with each other, by stratifying stratiform materials of an identical or a different kind over one another and freezing the stratified product, wherein dry ice may be interposed between the layers in partial areas thereof, whereby the layers can be bonded together at the portions devoid of dry ice and vacant spaces can be formed at the portions interposed by dry ice.

The materials to be treated are cooled and frozen within a short period of time by bringing the materials and dry ice placed in a freezing apparatus into contact with each other. As the freezing apparatus, any one may be used so long as it is constructed to permit the accommodation of the materials to be treated and dry ice therein in a mixed state and to bring them into contact, wherein it is favorable that the apparatus is so constructed as to subject the materials and dry ice to be pressed by their own weight or by an adequate mechanical or other means. In the case of bonding a plurality of materials to be treated, it is favorable to construct the freezing apparatus in such a manner that the bonding can be realized under pressing in a direction vertical to the bonded plane.

When the material to be treated is brought into contact with dry ice, the gas phase is replaced by evolved carbon dioxide gas to exclude ambient oxygen, while realizing at the same time a prompt freezing of the material to build up a frozen product. Dry ice may preferably be mixed in a form of crushed fine particles with the material to be treated, whereby the ambient air is replaced by the carbon dioxide gas evolved by heat absorption upon contact with the material to build up an inert atmosphere while causing the material to be frozen instantaneously.

If the material to be treated is present in a form of lumps of a relatively large particle size, freezing may require a somewhat longer time. However, when the material to be treated is partly broken before or after the freezing or simultaneously with the freezing, the freezing progresses also from the broken sites, whereby the freezing will be completed within a short period of time. In the case where the material to be treated is in a form of a liquid, jelly, slurry or the like, the freezing starts from a portion exposed to the outside or a portion contacting with dry ice. By pressurizing, also in this case, frozen portions become broken to cause thereby a region of a liquid state to be exposed, which is then frozen upon contact with dry ice. Such processes proceed within a relatively short period of time, whereby freezing occurs as a whole substantially instantaneously.

In this manner, by the contact of the material to be treated with dry ice, the ambient oxygen is replaced by carbon dioxide gas to establish an inert atmosphere with simultaneous freezing of the material suddenly, whereby enzymes will be deactivated and the material does not suffer from denaturation. Thereby a frozen product is obtained, in which each component, taste, color and other properties of the original material are retained as such. Even in the case where the material to be treated is subjected to mixing and breaking in the course of freezing, the heat developed thereby can be cooled by dry ice and will not cause any denaturation of the material but, rather, can favorably function to generate carbon dioxide gas to sweep off oxygen.

For bonding a plurality of materials to be treated, a plurality of materials held in contact with each other may be brought into contact with dry ice to cool them, whereby they adhere to each other and are frozen in this state. Such a phenomenon resembles the case where a bare hand adheres to a chilly wall surface in a cold season. Thus, the materials to be treated adhere to each other and are frozen in this state, whereby a bonded frozen product is obtained. The material to be treated will be deformed by pressing the bonded boundary face to spread the adhering interface to intensify the adhesion. If a liquid exudes from inside by pressing, the adhesive strength is further increased due to freezing of the liquid.

When a plurality of the materials to be treated are stratified into multilayers and the multilayers are frozen in a state in which dry ice is interposed between the layers partly, freezing proceeds by cooling from outside while, at the same time, freezing occurs also from inside due to cooling on the carbon dioxide gas evolved by the gasification of dry ice interposed between the layers leaving the portions where no dry ice is present in a state adhered to each other, whereby the freezing time may considerably be reduced together with attainment of prevention of debasement of quality and an increased adhesive strength. On progress of freezing, the portions of the layers where the dry ice interposed between the layers has disappeared will be brought into adhesion to each other, whereas the portions where dry ice remains will be frozen into a frozen product containing dry ice enclosed in such portions.

For the freezing apparatus, there may be employed those having a structure in which the material to be treated is accommodated simply together with dry ice to achieve cooling, those having a structure in which a means for blending and/or breaking is installed and those having a structure in which a pressurizing means is arranged. For the pressurizing means, there may be exemplified those in which the pressurization is effected in order to destroy the material partly and those in which the pressurization is effected in order to cause bonding of a plurality of materials to be treated. For the pressurization, there may be recited, for example, use of a piston-like pressing means and a technique in which the material to be treated is caused to travel for the extent over the pressing means under a condition of being pinched in between pressing boards.

One favorable method for stratifying and freezing the material consists of placing a piece of the material to be treated on a lower mold half (concave mold) made of Teflon (tetrafluoroethylene resin) cooled by dry ice or liquid nitrogen or in a refrigerator, roughly sprayed dry ice partly over the upper face of the material to be treated, placing thereon another piece of the material to be bonded therewith at normal temperature before the entire upper face of the first said piece of the material has been frozen, performing, if necessary, stratification on the so-stratified product by similar procedures to obtain multilayers and spraying dry ice particles on the uppermost layer to effect freezing of the multilayers while pressing the multilayers from above by an upper mold half (convex mold). Here, it is favorable to forward the material to be treated by rotating rollers arranged in the pressurizing section by a motor, whereby the process steps of freezing, bonding and molding can be carried out automatically. The pressure in the pressurizing section may range from 0.001 to 200 kN and may be 0.001–0.1 kN for a soft material, such as a strawberry, and 30–200 kN for a material having hard cell walls, such as chlorella.

The frozen product obtained as above may be subjected, directly or after having been stored and transported in the frozen state, to vacuum drying under a frozen state using a vacuum drying apparatus to produce a freeze-dried product. By placing the frozen product in a vacuum drying apparatus to maintain it under a vacuum condition, the freeze-dried product is obtained by drying under sublimation of humidity and dry ice contained in the frozen product. The degree of vacuum during the vacuum drying may be 1–50 Pa, preferably 1–5 Pa. Here also, there is no fear of denaturation, since the drying is realized in an inert atmosphere without passing through a liquid phase. In the case of a frozen product in which dry ice is enclosed in the inside as in the case where the freezing is effected in a multilayered state, a high vacuum drying efficiency may be attained and the drying can be realized within a short period of time, since the sublimation of ice is effected in a state of being rendered porous by the preceding sublimation of dry ice.

The so-obtained freeze-dried product is held under a condition in which the components, color, gustative taste, fragrance, flavor, mouth feel, physico-chemical properties and so on of the original material before the treatment are maintained and may be brought into a finished product after having been subjected, if necessary, to processing operations, such as cutting, crushing and so on. The freeze-dried product is obtained under a condition of not contacting with oxygen and can be stored, transported and serve for practical use in the inert state as such, while it may scarcely suffer from denaturation, even if it is stored and transported under a condition of being sealed with the addition of a deoxidant so long as it is not caused to absorb humidity. A freeze-dried product obtained by freeze-drying a plurality of materials to be treated under a condition of contacting with each other or being stratified into multilayers may preserve its bonded or stratified state without separation of the bonded part.

In the practice of the present invention, when cracks are formed in, for example, fibrous tissues, such as cellulose and muscle, and the cell walls of organisms, such as animals, plants and microorganisms, of the material to be treated, the surface area of contact will be increased to thereby increase the strength of adhesion between the materials to be treated, with simultaneous attainment of prevention of separation of the bonded part due to shrinkage, hardening or the like, whereby it is able to alter the tissue structure in such a manner that the internal contents of the tissue or the contents of the cells of the material to be treated can easily exude out to increase the rate of digestion together with softer mouth feel.

For the materials to be utilized as the freeze-dried product, any voluntary substance including bodies of organisms and organic materials may be enumerated. Specific examples include foods, such as vegetables, fruits, meats and dairy products; medicines, such as crude drugs obtainable from organisms; bodies of organisms; samples of organisms for analytical purpose in which tissues or so on are homogenized; bacterial cells of, such as yeasts and bacteria; and industrial raw materials, such as doughs, starches and proteins. Bacterial cells will lose their proliferative activity by the formation of cracks in the cell walls and may occasionally become inviable by the destruction of the cell walls, while, in such cases, use as vaccines may be permitted, since the destruction of cell walls can be realized without any damage of corresponding proteins to serve as an antigen. When miscellaneous bacteria are inviable by increasing the impressed pressure, safety of foods and so on are increased.

The freeze-dried product can be used in the dried state as such in accordance with the purpose, while it may be used in the restored state by hydrating it or, further, after being subjected to processings, such as heating etc. The material to be treated will be restored by hydration to the original state before the freeze-drying and the taste, gustative taste, fragrance and so on will also be regained. A bonded product obtained by bonding a plurality of materials to be treated or a multilayered product resulting from the stratification of them will maintain the bonded or stratified state without causing any peeling-off even after having been regained by water and the bonded or stratified state is kept even after having been subjected to processing operations, such as heating etc.

While the freeze-dried product can be used in the state as such or after having been hydrated or processed, as given above, it may be used under compounding with other materials. For example, in the case of using the freeze-dried product for a food or a drink, a superior composite food or drink can be obtained by compounding or processing and cooking it together with a jelly, chocolate, juice, milk, cream, bread dough, cake dough, pasta, rice, vegetable or so on. In these cases also, the freeze-dried product maintains its fresh state before the freeze drying and elution of soluble components, such as sugars, acids, enzymes and so on is scarce.

When fruits and vegetables, such as raisins, pumpkins and carrots, are added to bread or pie, the border of them may, in general, become sticky due to exudation of moisture and sugars from such an additive. However, when the freeze-dried product according to the present invention is employed, such a sticky feel is eliminated and superior appearance and superior mouth feel are attained. When apple, kiwi fruit or the like are admixed to milk, cream, white chocolate or the like, coagulation of proteins, such as casein, may occur due to the presence of an acid. When, however, the freeze-dried product according to the present invention is used, no acid is eluted and coagulation does not occur, whereby a smooth mouth feel can be attained. While there occurs no coagulation by mixing a fruit or other having a content of a protein-decomposing enzyme, such as kiwi fruit, with jelly, no such problem occurs when the freeze-dried product according to the present invention is mixed, and coagulation of jelly occurs. Thus, even using a component which is difficult to be compounded due to their influence on each other, a composite product of, for example, a food or a drink, which is not influenced by each component, can be obtained when the freeze-dried product according to the present invention is compounded with the other material.

By the process and apparatus for freeze-drying according to the present invention, a material to be treated can be freeze-dried while maintaining the quality, properties and so on before the treatment, without suffering from denaturation by oxygen, heat and so on, together with reduction of the time required for the drying, and, in addition, by subjecting a plurality of materials to be treated with each other in a contacted or stratified state, a freeze-dried product in which the materials to be treated are bonded or stratified can be obtained, since one single material or a plurality of materials to be treated are vacuum-dried after having been cooled and frozen by dry ice in a state of being isolated from or contacted with each other.

The freeze-dried product according to the present invention is inert and maintains the original quality, properties and so on before the treatment and a freeze-dried product in which a plurality of materials to be treated are bonded together or stratified one over another can be obtained. It can be stored, transported and used as such and can be utilized for a food, medicine, feed or so on having high functional performances. Here, a food or so on which is safe for a long period of time can be obtained by causing bacteria to be inviable.

THE BEST MODE FOR EMBODYING THE INVENTION

Below, some embodiments of the present invention are described with reference to the drawings appended.

Figure 1:
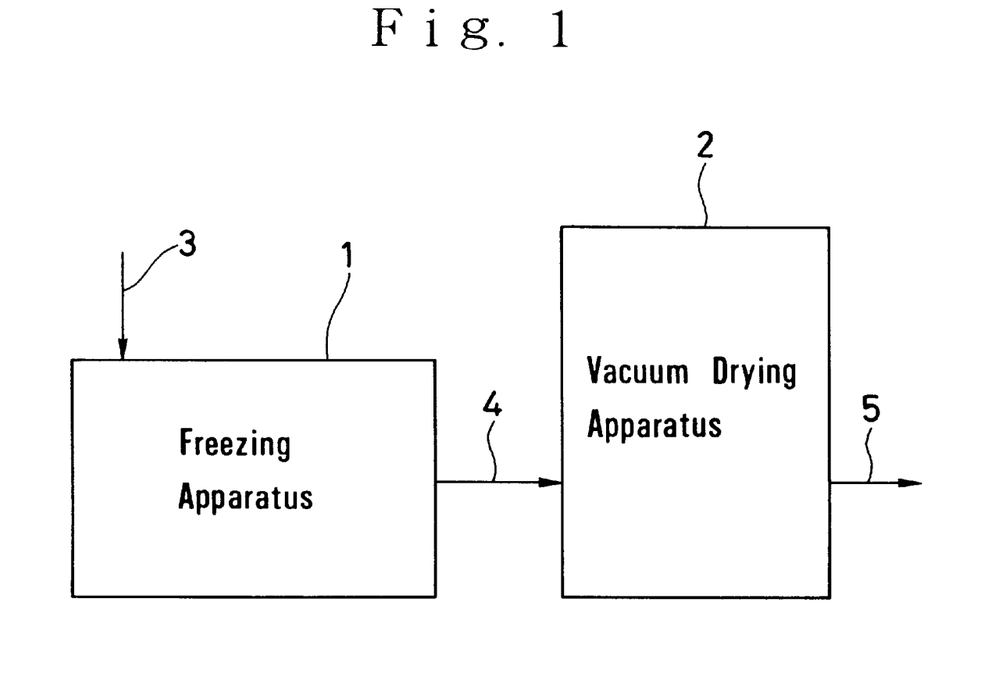
FIG. 1 shows the construction of an embodiment of a freeze-drying apparatus.
Figure 2:
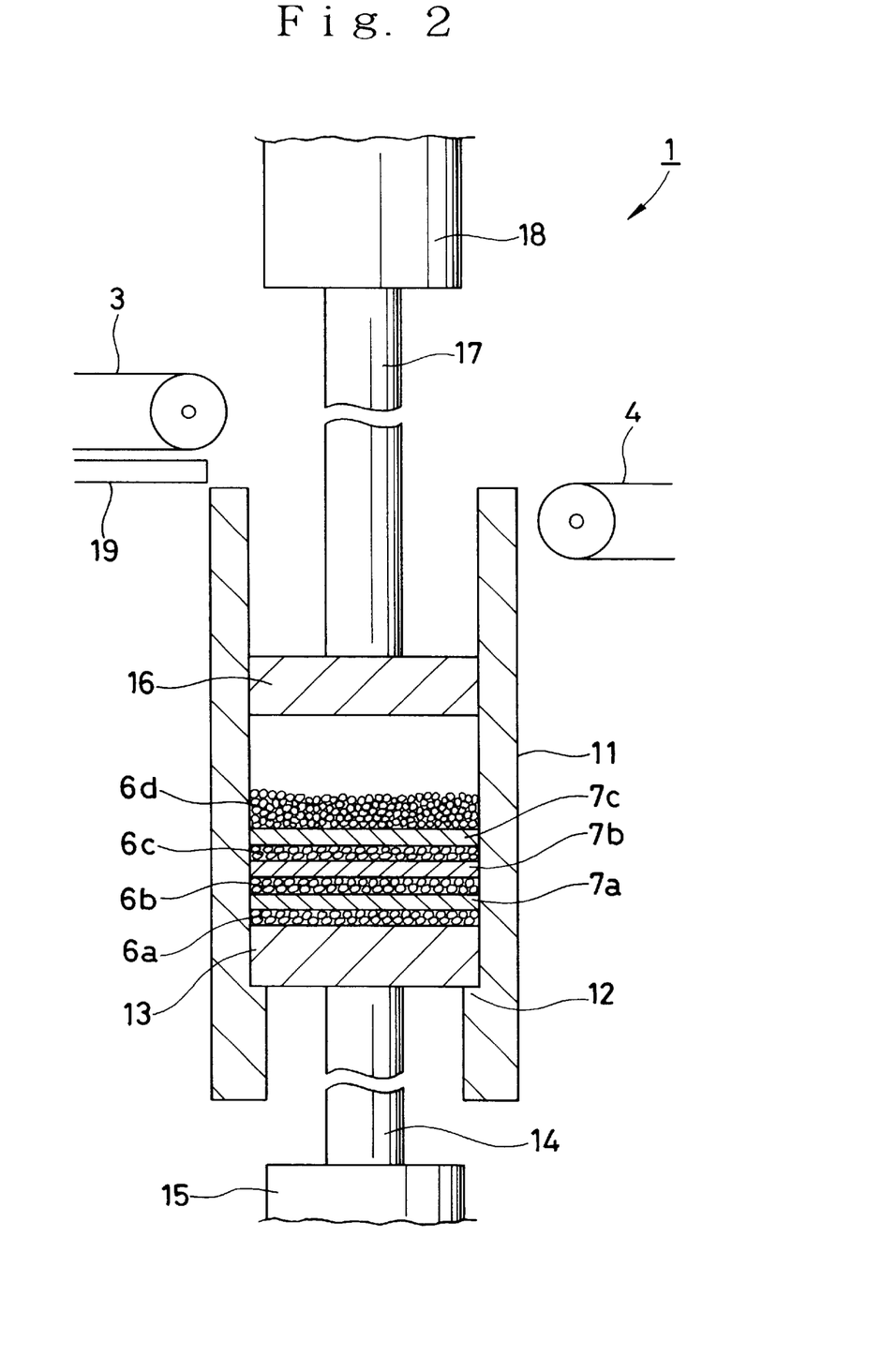
FIG. 2 shows an embodiment of a freezing apparatus in a sectional view.
Figure 3:
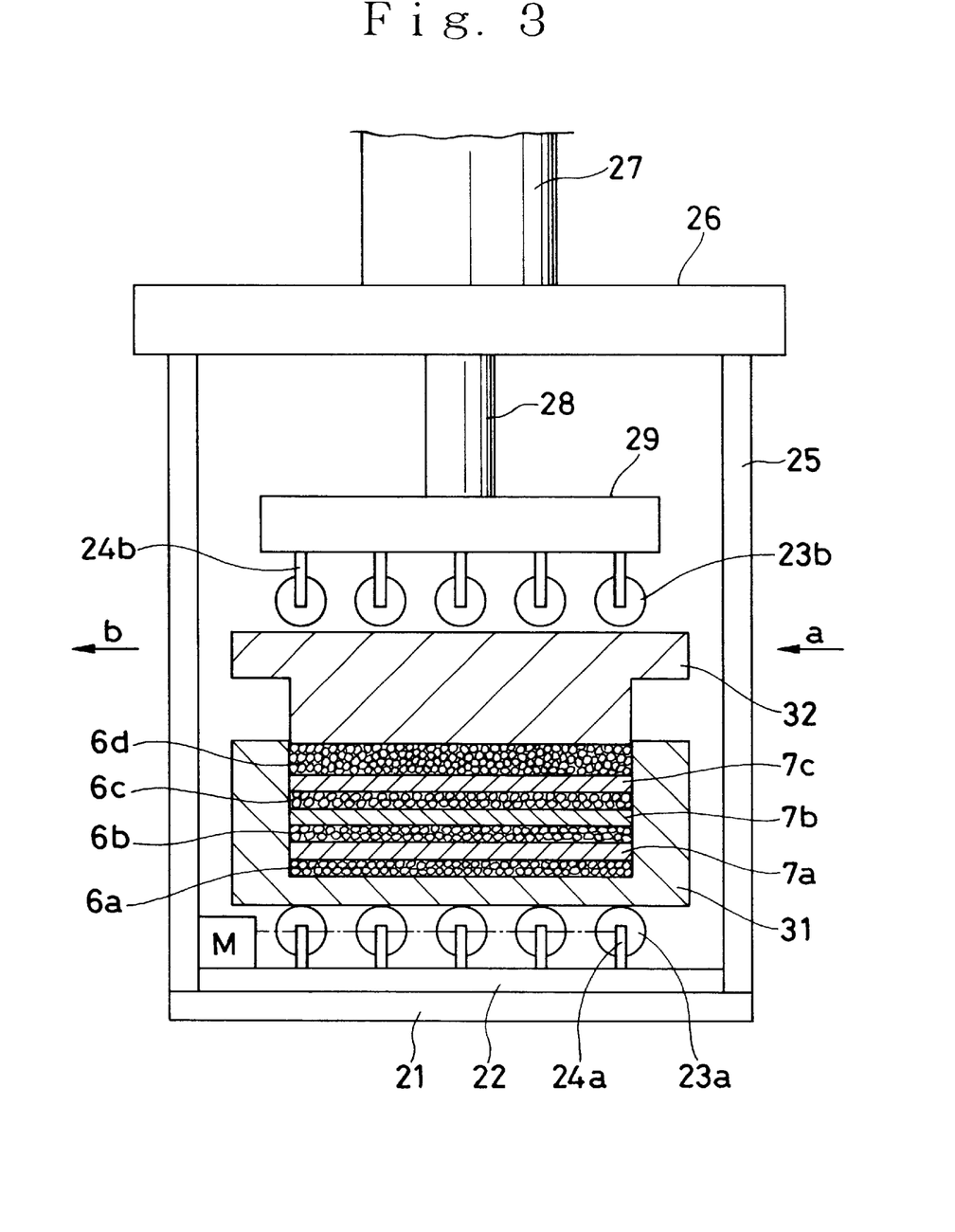
FIG. 3 shows another embodiment of the freezing apparatus in a sectional view.

FIG. 1 shows the structure of an embodiment of a freeze-drying apparatus in an exploded view. FIGS. 2 and 3 show another embodiment of the freezing apparatus in sectional views.

In FIG. 1, 1 denotes a freezing apparatus and 2 is a vacuum drying apparatus. They are so constructed that the material to be treated and dry ice are supplied to the freezing apparatus 1 via a supply line 3 to effect freezing and the resulting frozen product is transferred to the vacuum drying apparatus 2 via a transfer line 4 to subject it to vacuum drying, whereupon the freeze-dried product is taken out via a take-out line 5.

In the freezing apparatus shown in FIG. 2, a casing 11 of a cylindrical form has a support 12, on which a ram top 13 serving as a pressurizing element is supported slidably so as to permit movement in the vertical direction by a hydraulic cylinder 15 via a ram rod 14 connected underneath. Opposing the ram top 13, another ram top 16 serving as a pressurizing element is arranged slidably and is permitted to move in the vertical direction by a hydraulic cylinder 18 via a ram rod 17 connected above. In the vicinity of the upper end of the casing 11, the supply line 3 and the transfer line 4, both in the form of a belt conveyer, are disposed. 19 is a pusher.

For performing the freezing by the freezing apparatus given abode, dry ice 6a of a particle size of, for example, 1–5 mm is supplied on the ram top 13 over the entire surface thereof, while the ram top 16 is held at an elevated position where it is receded somewhat from the upper end of the casing 11, so as to pile up to a depth of, for example, 3–7 mm. Thereon are placed then, as a material to be treated 7a in a layered form, for example, sliced pieces of kiwi fruit having a thickness of 5–10 mm, on which dry ice particles 6b are piled sparsely (partly), whereupon, for example, strawberry slices, as a material to be treated 7b, are placed thereon, on which, further, dry ice particles 6c are piled sparsely, whereupon, furthermore, a material to be treated 7c is placed thereon, which is then covered by dry ice particles 6d up to a depth of 5–15 mm.

Then, in this state, the ram top 16 is caused to descend using the hydraulic cylinder 18 to effect pressing to thereby cause the materials to be treated 7a, 7b and 7c to adhere to each other at the portions devoid of dry ice 6b and 6c and to cause at the same time the freezing of the entire composite. Here, the dry ice piles 6a and 6d present above and underneath cause cooling from outside, while cooling is effected also from inside by the interlayer dry ice piles 6b and 6c with simultaneous replacement of the gas phase, whereby the materials to be treated 7a, 7b and 7c are frozen in a state adhered to each other to obtain a frozen product.

The frozen product is raised by causing the ram top 16 to ascend while raising the ram top 13, whereupon it is taken out on the transfer line 4 by extending the pusher 19 and is transferred to the vacuum drying apparatus 2, where it is subjected to vacuum drying to produce a freeze-dried product.

The freezing apparatus shown in FIG. 3 is so constructed that a plurality of pressurizing rollers 23a are arranged upwardly and supported by means of a bearing element 24a on a bed plate 22 disposed on a bottom wall 21, in which each roller 23a rotates in the same rotational sense (for example, counterclockwise, seen on the Figure) by means of a motor M. A the top, a deck 26 provided thereon with a hydraulic cylinder 27 is supported on support frames 25. Beneath a ram top 29 arranged at the end of a ram rod 28 extending down from the hydraulic cylinder 27, a plurality of pressurizing rollers 23b are arranged downward, supported by a bearing element 24b. 31 and 32 respectively represent a lower mold half (concave mold half) and an upper mold half (convex mold half) of a forming mold made of Teflon (tetrafluoroethylene resin), respectively, as the pressurizing elements.

For performing the freezing on the apparatus given above, the lower mold half 31 is charged with dry ice 6a–6d and the material to be treated 7a–7c in a similar construction as in FIG. 2, whereupon the end of the upper mold half 32 is inserted in the lower mold half and, in this state, the lower mold half 31 and the upper mold half 32 of the forming mold are moved in the direction indicated by the arrow 'a' between the pressurizing rollers 23a and 23b, before bonding, molding and freezing are effected by pressing the ram top 29 downwards by actuating the hydraulic cylinder 27 in the manner similar to the case of FIG. 2. Since the pressurizing rollers 23a rotate in the same direction by the motor M, the mold is moved out in the direction indicated by the arrow 'b'.

While it is permissible to perform the above process steps of moving-in of the mold, pressing thereof by the hydraulic cylinder 27 and moving-out thereof by the motor M independently, they may be carried out totally in a continuous way. Thus, a continuous processing may be realized by moving the mold 31, 32 into the interspace between the pressed rollers 23a, 23b continuously to effect the pressurization and moving it out then directly therefrom, whereby an increase in the production efficiency can be attained. In both cases, automatic operation of the apparatus can be realized.

By opening the so-moved-out mold, taking out the frozen product and transferring the frozen product to the vacuum drying apparatus 2 to carry out vacuum drying, a freeze-dried product is obtained. When a fluororesin, such as tetrafluoroethylene resin or the like, is employed for the forming mold, a better performance in separation from the mold is attained. Dry ice piles 6a and 6d may facilitate mold separation, since dry ice functions also as a separating agent. However, it is permissible to install a mechanical means for effecting removal of the molding from the mold.

The vacuum drying apparatus 2 is an apparatus for effecting vacuum-drying under a reduced pressure established by a vacuum pump, for which a commercial unit comprising a heating unit for increasing the sublimation velocity by heating the material to be treated at a temperature of 20–30° C. and a refrigerator for cooling the cooling coil serving for trapping the sublimated moisture at minus 50° C. may be employed.

Below, the present invention will be described by way of Examples.

EXAMPLE 1

Using a freezing apparatus as shown in FIG. 3, a freeze-dried product was produced. As materials to be treated 7a and 7c, slices of kiwi fruit having a thickness of 5–10 mm and, as the material to be treated 7b, slices of strawberry having a thickness of 5–10 mm were employed. Dry ice having a particle size of 3 mm was used and was piled in a thickness of 5 mm for the lower layer 6a and a thickness of 10 mm for the upper layer 6d and was scattered in the interlayer portions 6b and 6c sparsely in an amount of 1–2 particles per $cm^2$. A frozen product was obtained under impression of a pressure of 10 N for 60 seconds. The frozen product was transferred to a commercial vacuum drying apparatus and subjected to vacuum drying under a degree of vacuum of 2 Pa for 48 hours at a drying tray temperature of 20° C. to produce a freeze dried product.

The resulting freeze-dried product consisted of multilayers in which the materials to be treated 7a, 7b and 7c were bonded to each other and no separation occurred after they were restored with water, wherein the color, taste and fragrance were maintained under the original state.

In general, when a raw kiwi fruit or raw strawberry is admixed with milk or a dairy product, coagulation of casein, a protein, occurs by the organic acids present in the fruit. However, there occurred no coagulation by admixing of the freeze-dried products, whereby dairy products with a smooth mouth feel, such as processed dairy products, yogurt and white chocolate, could be produced.

When a bread and a pie containing a freeze-dried product of pumpkin and carrot were prepared, there occurred no portion of a sticky structure as appears in the case of blending with raw pumpkin or raw carrot and a bread or pie exhibiting crispy mouth feel was able to be produced.

EXAMPLE 2

Using an apparatus as shown in FIG. 3, pieces of raw kiwi fruit (major diameter of 30–60 mm, minor diameter of 30–45 mm) cut in a thickness of 10 mm and pieces of cylindrically cut raw papaya (diameter about 20 mm, thickness 10 mm) inserted in each central portion of each piece of kiwi fruit, as the materials to be treated, were placed on a layer of dry ice spread in a pressing vessel and, then, granular dry ice was scattered sparsely over the surface, whereupon the composite was subjected to a weak pressing at 10 N for one minute to cause a partial breaking down of the materials to be treated, in order to subject it to a freeze-drying under a condition in which slight cracks were formed. As a result, light-colored dry products were able to be prepared, in which the fragrances of the fruits were better preserved. When the observed calorimetric values of a luminosity of about 50, a b-value of about 24, yellow, for the freeze-dried product of kiwi fruit are compared with those of the raw kiwi fruit, the luminosity was increased by about 60% and the b-value was reduced by about 30%. When the observed values of the luminosity (about 75) and the b-value (about 50, yellow) for the freeze-dried product of papaya are compared with those of the raw papaya, the luminosity was increased by about 10% and the b-value was reduced by about 60%.

When cakes were prepared by enclosing these freeze-dried products in a layer of transparent jelly, the b-value for kiwi fruit was restored nearly to that of raw kiwi fruit. The luminosity showed a value intermediate between that of the freeze-dried product and that of the raw fruit. While the luminosity of papaya was nearly the same as that of the raw fruit, the b-value showed an intermediate value between the freeze-dried fruit and the raw fruit.

While raw kiwi fruit and raw papaya do not show coagulation of jelly due to their content of a protease for decomposing proteins, such as jelly, it was possible to prepare a completely coagulated jelly by using the freeze-dried product, since elution of enzymes is difficult.

INDUSTRIAL APPLICABILITY

The process for freeze-drying according to the present invention can be applied for preserving, for transporting and for practical use by freeze-drying bodies of organisms, organic substances, drugs, samples of organisms, industrial raw materials and so on, which are subject to denaturation by the actions of oxygen, enzymes, heat and so on, in a state in which the original quality, properties and so on before the treatment are preserved.

What is claimed is:

1. A process for freeze-drying one or more materials, comprising the steps of: cooling the one or more materials by dry ice to freeze the one or more materials while breaking the one or more materials by subjecting the one or more materials to pressurization to cause the formation of cracks therein and subjecting the frozen one or more materials to vacuum drying.

2. The process of claim 1, wherein more than one material is freeze-dried and the materials are cooled in a state wherein they are separated from each other.

3. The process of claim 1, wherein more than one material is freeze-dried and the materials are cooled in a state wherein they are in contact with each other.

4. The process of claim 1, wherein more than one material is freeze-dried and the materials are cooled in a state wherein portions of the materials are in contact with each other and portions of the materials are separated from each other.

5. The process of claim 1, wherein the freezing is effected under a condition in which the one or more materials is pressurized by its own weight or by an external pressure.

6. A freeze-dried product obtained by the process of claim 1.

7. A food or drink comprising the freeze-dried product of claim 6.

8. A composite product comprising the freeze-dried product of claim 6 compounded with another material.

9. A process for freeze-drying materials comprising the steps of:
   stratifying the materials so that they are provided in multilayer form;
   interposing dry ice between layers of the multilayer materials;

freezing the multilayer materials while breaking the multilayer materials by subjecting the multilayer materials to pressurization to cause the formation of cracks therein; and subjecting the frozen multilayer materials to vacuum drying.

10. The process of claim 9, wherein the materials are of the same kind.

11. The process of claim 9, wherein the materials are of different kinds.

12. The process of claim 9, wherein the dry ice is intermittently interposed between the layers so that portions of the layers that are devoid of dry ice adhere to each other and vacant spaces are formed at portions of the layers where the dry ice is provided.

13. The process of claim 9, wherein the freezing is effected under a condition in which the materials are pressurized by their own weight or by an external pressure.

14. A freeze-dried product obtained by the process of claim 9.

15. A food or drink comprising the freeze-dried product of claim 14.

16. A composite product comprising the freeze-dried product of claim 14 compounded with another material.

17. A hydrated product obtained by hydrating the freeze-dried product of claim 6.

18. A hydrated product obtained by hydrating the freeze-dried product of claim 14.

19. A composite product comprising the hydrated product of claim 17 compounded with another material.

20. A composite product comprising the hydrated product of claim 18 compounded with another material.

* * * * *